Oct. 7, 1930.  F. S. GILLESPIE  1,777,520
GLARE HAZARD REDUCING DEVICE FOR VEHICLES
Filed Oct. 29, 1927
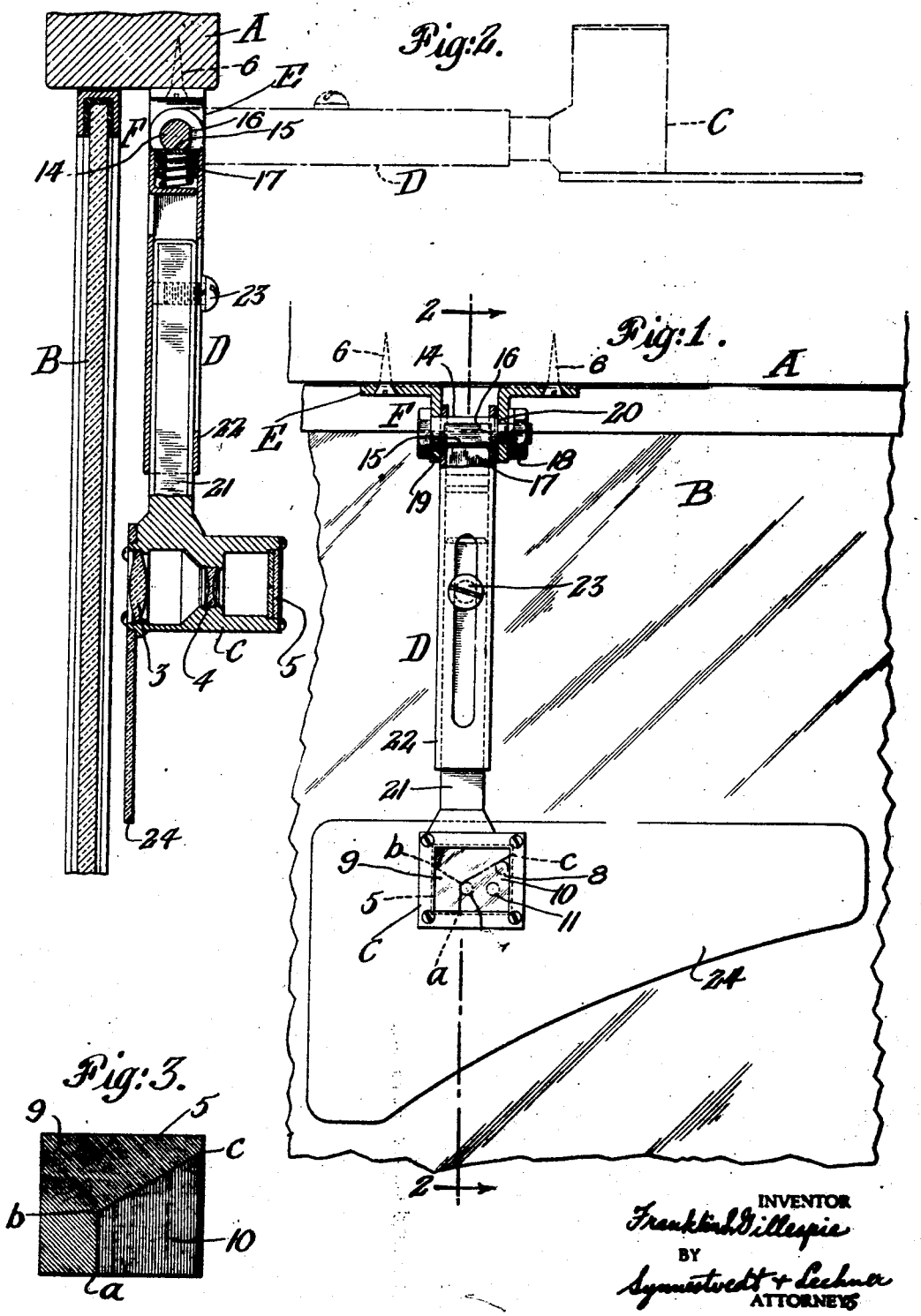

Patented Oct. 7, 1930

1,777,520

UNITED STATES PATENT OFFICE

FRANKLIN S. GILLESPIE, OF SWARTHMORE, PENNSYLVANIA

GLARE-HAZARD-REDUCING DEVICE FOR VEHICLES

Application filed October 29, 1927. Serial No. 229,552.

This invention relates to devices for apprising the operator of a vehicle as to the relative location of an approaching vehicle by its lights and is particularly useful in automobiles in connection with which the glare hazard is great.

When driving automobiles at night it is often very difficult to gauge, with assurance, the clearance needed to safely pass an approaching automobile, particularly when the approaching vehicle has glaring headlights, and, therefore, it is the primary object of my invention to provide a device onto which an image of the lights of an approaching automobile is projected and which will thus apprise the operator as to the relation of such automobile to his automobile so that it is unnecessary for him to look into the glaring lights in passing the automobile.

More specifically stated, it is an object of my invention to provide a device having a translucent plate onto which an image of such lights is projected on a small scale to apprise the operator whether or not the automobile carrying the lights is in a danger zone, so to speak, or in a clear zone in which passing is safe.

Another object of my invention is the provision of a device of the character described which may be mounted on or at the windshield of an automobile in such manner that it may be readily moved to accurate position for reading the location of the lights or to a position out of the way when not in use.

How the foregoing, together with such other objects and advantages as may hereinafter appear, or are incident to my invention, are realized is illustrated in preferred form in the accompanying drawings, wherein—

Fig. 1 is a front elevational view of the device with certain parts appearing in section.

Fig. 2 is a cross section taken substantially on the line 2—2 of Fig. 1, and illustrating the position in which the device may be placed when not in use in dot and dash lines, and Fig. 3 is an enlarged detail view of a plate which I employ.

Referring to the drawings, I have illustrated the device as mounted inside of an automobile and on the cross member A of the automobile above the windshield B. The device comprises, in general, a housing or casing C for the lenses 3 and 4 and the translucent plate 5; an arm or supporting member D carrying said housing; and bracket means E to which the arm D is pivotally secured. In this instance the bracket means E is secured to the cross member A of the automobile by means of screws 6, it being understood, however, that if desired, it may be secured to the windshield, or to any other convenient member.

A convex lens 3 is secured in the housing C at the end thereof farthest away from the operator, i. e., adjacent the windshield, and a concave lens 4 is also secured in the housing C, which lens is spaced from the lens 3. At the end of the housing opposite the end at which the lens 3 is secured, i. e., the end nearest the operator, and spaced from the concave lens 4, I have secured a translucent plate 5 preferably of colored glass, onto which an image of the lights of an approaching automobile is projected on a small but distinct scale. The size, power, and spacing of the lenses, as well as the spacing of the translucent plate 5 from the lenses, may be calculated by those skilled, in this art, so that a clearly visible image will be projected in a device of small size, and I have found that these can be made such that the housing can be as small as one inch looking at the front of the device, and two inches in length looking at the side. In a device of this size I have found that the image of a headlight thirty feet away is projected as about one quarter inch in diameter.

The device is so calculated that when an approaching automobile is five hundred feet distant and so positioned to one side of the automobile equipped with the device that its nearest headlight is four feet to the left of the vertical center line of the device, the image of such light will be projected onto the translucent plate at a point approximately one-third the distance up on an imaginary vertical line drawn approximately one-third the distance from the left edge of the plate, and when the approaching automobile is thirty feet distant and in the same lateral relation, the image will be projected at a point toward the upper right hand corner of the plate, but slightly below such corner. Referring to Fig. 1, I have indicated the two above positions by dot and dash circles 7 and 8 respectively.

The field of the plate 5 is preferably divided into two differently colored sections 9 and 10, the configuration of which at the dividing line is indicated in Figs. 1 and 3 by the line $a$, $b$, $c$, which line extends vertically upward from a point along the lower edge of the plates approximately one-third the distance from the left edge of the plate to a point one-third the distance of the height of the plate, and from thence substantially diagonally to a point along the right edge of the plate a short distance from the upper right hand corner of the plate. The section 9 may be termed a danger section and may be colored red or amber, and the section 10 may be termed a safety section and may be colored green or blue. In the drawing I have shown the translucent plate 5 comprised of two pieces of glass cemented together with their adjacent surfaces colored as above pointed out, although it will be understood that I contemplate making the plate of a single thickness of stained glass of suitable colors configured in accordance with the above description.

It will be noted that with the automobiles in the relative positions hereinbefore mentioned, the images 7 and 8 lie in the safety section. The circle 11 indicates the image of the headlight of the approaching automobile which is farthest from the operator.

In connection with the peculiar configuration of the sections 9 and 10, it is pointed out that this is due to the change in angle incident to the shortening of the distance between the lights and the automobile equipped with the device. Stated in another way, the sections 9 and 10 are configured to compensate for such change in angle.

Referring to the manner of installing the device, the procedure is as follows:

First of all, the device is lined up so that the arm D is in a vertical position, both looking at the front and the side, and then it is moved longitudinally of the windshield until a position is found so that with the two automobiles in the positions above indicated, the images will be projected on the plate at the points 7 and 8, respectively. Then the holes for the screws 6 may be located and the device secured in place.

In order that the device may be readily swung clear of the windshield when not in use, and thereafter returned to proper and accurate working position, I have provided a novel hinge device F comprising a hinge pin 14 having two flattened surfaces 15 and 16 cooperating with a spring pressed plunger 17 carried by the arm D to cause the device to snap into its accurate working position when moved toward the windshield and to snap into a position parallel with the roof of the automobile when moved away from the windshield.

The hinge pin 14 is movable or adjustable so that the relative positions of the flats 15 and 16 to the bracket E may be altered. This adjustment is important for the reason that in some instances the bracket E may have to be secured to a surface which is neither parallel nor at right angles to a vertical line and in such cases the pin 14 would be turned on its axes until the flat surface 15 would lie at right angles to a vertical line. The bracket E then would be turned on the pin to an angle corresponding to the angle of the surface to which it is to be secured. The adjustment is made by loosening the nut 18, and after adjustment the nut 18 is tightened to lock the pin 14 to the bracket in its adjusted position. The pin 14 is shouldered at 19 and 20 to permit the arm D to have freedom of movement about the pin 14.

In order to adjust the plate 5 as to height, the arm D is made adjustable for example, by having one portion 21 thereof telescope into the other portion 22 thereof. A locking screw 23 is provided for locking the arm in its adjusted position.

A glareshield 24 may be associated with the plate 5 to prevent glare from lights when reading the plate.

From the foregoing it will be seen that I have provided a simple and compact mechanism whereby the operator of an automobile may be apprised as to the location of approaching lights by reading a translucent plate on which the image of the lights is projected, and thus, without glancing directly at the lights, may gauge, with assurance, the distance required to pass the approaching lights. When the image appears in the danger section of the plate, the operator is immediately aware that passing is unsafe.

I claim:—

A device for apprising the operator of a vehicle as to the location of another vehicle including a translucent plate, means for projecting an image of the lights of said other vehicle upon the plate, the relation of said means to the plate and the relation of the plate to the vehicle being such that the projection of the image on the plate as an indication of the passing relation of the two vehicles, said plate having means indicating danger when the passing relation is such as to be unsafe, and means for supporting said projecting means and said plate in the aforesaid relations for observance by the operator when he occupies his normal position for operating the vehicle.

In testimony whereof I have hereunto signed my name.

FRANKLIN S. GILLESPIE.